United States Patent
Weitzel et al.

(12)

(10) Patent No.: US 6,197,871 B1
(45) Date of Patent: Mar. 6, 2001

(54) THICKENERS BASED ON CARBOXYL-AND CARBOXAMIDO-CONTAINING ADDITION POLYMERS

(75) Inventors: Hans-Peter Weitzel, Reischach; Robert Braunsperger, Burghausen, both of (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/500,946

(22) Filed: Jan. 15, 2000

Related U.S. Application Data

(63) Continuation of application No. 09/129,006, filed on Aug. 4, 1998, now abandoned.

(30) Foreign Application Priority Data

Aug. 18, 1997 (DE) .............................. 197 35 736

(51) Int. Cl.$^7$ ..................................... C08L 29/04
(52) U.S. Cl. ............................................ 524/503
(58) Field of Search ................................. 524/503

(56) References Cited

U.S. PATENT DOCUMENTS 4,879,361 * 11/1989 Rehmer ................................ 526/201

* cited by examiner

*Primary Examiner*—Paul R. Michl
(74) *Attorney, Agent, or Firm*—Burgess, Ryan & Wayne; Milton J. Wayne; William R. Moran

(57) ABSTRACT

The invention provides thickeners based on carboxyl- and carboxamido-containing addition polymers obtainable by free-radical emulsion or suspension polymerization of:
a) from 30 to 70% by weight of carboxyl-containing, ethylenically unsaturated monomers,
b) from 10 to 70% by weight of carboxamido-containing, ethylenically unsaturated monomers, and
c) from 0.1 to 30% by weight of further ethylenically unsaturated monomers in the presence of at least 5% by weight of one or more water-soluble protective colloids from the group consisting of polyvinyl alcohols, polyvinyl pyrrolidones and (meth)acrylate-(meth)acrylic acid copolymers, the percentages by weight being based in each case on the overall weight of the comonomers.

10 Claims, No Drawings

THICKENERS BASED ON CARBOXYL- AND CARBOXAMIDO-CONTAINING ADDITION POLYMERS

This is a continuation of application Ser. No. 09/129,006, filed Aug. 4, 1998 by Dr. Hans-Peter WEITZEL, et al for THICKENER BASED ON CARBOXYL- AND CARBOXAMIDO-CONTAINING ADDITION POLYMERS, abandoned.

BACKGROUND OF THE INVENTION

1) Field of the Invention

The invention relates to thickeners based on carboxyl- and carboxamido-containing addition polymers, to their use in coating compositions, adhesives and hydraulically setting binders, and to processes for their preparation.

2) Background Art

In addition to polyurethane thickeners and celluloses, carboxyl- and carboxamido-containing aqueous copolymer dispersions are widely employed as thickeners. They develop their thickening action only in an alkaline medium following neutralization of the carboxyl groups. In order to achieve a good thickening effect, high molecular weights are required in these polymers. A disadvantage of these products is that they possess very high viscosities in neutralized form but in acidic form are not stable on storage. In order to avoid these disadvantages, the following procedures are known.

In EP-A 529 206 (U.S. Pat. No. 5,545,688) polyacrylamide is prepared by inverse emulsion polymerization. This technique can be transferred to carboxylate-containing polymers, and in DE-A 3520507 (U.S. Pat. No. 4,681,912) a water-in-oil microemulsion comprising an aqueous acrylamide/acrylic acid solution, an organic solvent and a nonionic surfactant is polymerized. A disadvantage of this method, however, is that large amounts of organic solvent must be used in order to ensure the phase inversion and must then be separated off again subsequently, which is complex. These organic solvents, such as Isopar®M and toluene, moreover, are nowadays unacceptable on environmental grounds.

According to EP-A 736 547 (CA-A 2173297) the problems set out above can be avoided by preparing conventional emulsion polymers from water-soluble and water-insoluble monomers, but again in the presence of organic solvents which must subsequently be separated off by distillation. A further disadvantage is that in order to obtain stable dispersions use is made in addition of surfactant monomers which act as associatively thickening groups.

EP-A 450 437 (U.S. Pat. No. 5,231,145) describes copolymers based on alkyl acrylates and/or alkyl methacrylates, prepared with polyvinyl alcohol as protective colloid, for use as sizes. The products, however, are unsuitable for use as thickeners since they show no increase in viscosity on neutralization.

The object of EP-A 627 450 was to prepare thickeners based on (meth)acrylate-(meth)acrylic acid copolymers which are present in acidic form as a stable dispersion and exhibit no Weißenberg effect, without using the toxic compound ethyl acrylate. Said object was achieved by means of polyvinyl alcohol-stabilized, (meth)acrylate-based copolymer dispersions which are described as being suitable thickeners for aqueous dispersions, especially emulsion paints. The thickening effect, however, is not sufficient to provide the required stability in hydraulically setting compositions.

Thickeners obtainable commercially include those based on acrylamide-acrylic acid copolymers prepared by the technique of precipitation polymerization. A disadvantage of such a thickener is that, in the acidic state in which the product is obtained, its storage stability is unsatisfactory, and without stirring the product rapidly forms a sediment and an agglomerating product cake which can no longer be stirred up or disrupted. For this reason the product is converted at an early stage into the neutralized form, in which it is indeed storage-stable but has a very high viscosity (10,000 mPas at 7% solids content) and can therefore be prepared only in very highly diluted form, and hence uneconomically.

The object was therefore to provide storage-stable, water-soluble polymers of low viscosity which can be employed as thickeners.

SUMMARY OF THE INVENTION

The invention provides thickeners based on carboxyl- and carboxamido-containing addition polymers obtainable by free-radical emulsion or suspension polymerization of a) from 30 to 70% by weight of carboxyl-containing, ethylenically unsaturated monomers, b) from 10 to 70% by weight of carboxamido-containing, ethylenically unsaturated monomers and c) from 0.1 to 30% by weight of further ethylenically unsaturated monomers in the presence of at least 5% by weight of one or more water-soluble protective colloids from the group consisting of polyvinyl alcohols, polyvinyl pyrrolidones and (meth)acrylate-(meth)acrylic acid copolymers, the percentages by weight being based in each case on the overall weight of the comonomers.

DESCRIPTION OF THE PREFERRED EMBODIMENTS

Suitable carboxyl-containing monomers a) are ethylenically unsaturated mono- and dicarboxylic acids, preferably acrylic, methacrylic, maleic, itaconic, fumaric and crotonic acid. Particular preference is given to acrylic and methacrylic acids.

Suitable carboxamido-containing monomers b) are the amides of the acids referred to under a), preferably the monoamides and diamides of acrylic, methacrylic, maleic, itaconic, fumaric and crotonic acid. Particular preference is given to acrylamide and methacrylamide.

Monomers suitable as further ethylenically unsaturated monomers are hydrophobic monomers, examples being vinyl esters, (meth)acrylates and vinylaromatic compounds. Preference is given to the methacrylates and acrylates of $C_1$ to $C_{12}$ alcohols, with particular preference n-butyl acrylate, n-butyl methacrylate, 2-ethylhexyl methacrylate and 2-ethylhexyl acrylate.

Preferably, from 30 to 60% by weight of carboxyl-containing monomers a) and from 30 to 60% by weight of carboxamido-containing monomers b) are copolymerized and the proportion of hydrophobic comonomer c) is restricted to the necessary minimum, preferably from 5 to 20% by weight.

As protective colloids it is preferred to employ partially hydrolyzed polyvinyl alcohols having a Höppler viscosity (DIN 53015, Höppler method, 4% strength aqueous solution) of from 3 to 28 mPas and a hydrolysis number of from 70 to 200. Particular preference is given to the use of partially hydrolyzed polyvinyl alcohols having a Höppler viscosity of from 3 to 15 mPas and a hydrolysis number of from 100 to 150. The partially hydrolyzed polyvinyl alcohols may be employed alone or in a mixture with other water-soluble protective colloids. By water-soluble here is meant that under normal conditions more than 10 g of the substance can be dissolved in a liter of water. The protective colloids are preferably employed in an amount of from 10 to 80% by weight.

The thickeners are prepared by the technique of emulsion or suspension polymerization in the aqueous phase, preferably at temperatures of from 30 to 60° C. Polymerization is initiated by the customary initiators, oil-soluble initiators for suspension polymerization and at least partially water-soluble initiators for emulsion polymerization.

Preference is given to preparation by the emulsion polymerization technique. Initiation takes place by means of the customary, at least partially water-soluble free-radical initiators, which are preferably employed in amounts of from 0.01 to 3.0% by weight, based on the overall weight of the monomers. Examples of these initiators are sodium persulfate, hydrogen peroxide, t-butyl peroxide, t-butyl hydroperoxide; potassium peroxodiphosphate, azobisisobutyronitrile. If desired, said free-radical initiators can also be combined in a known manner with from 0.01 to 6.0% by weight of reducing agents, based on the overall weight of the monomers. For example, alkali metal formaldehyde-sulfoxylates and ascorbic acid are suitable. In the case of redox initiation, one or both redox catalyst components are preferably metered in the course of polymerization.

As dispersants it is possible if desired to employ anionic or nonionic emulsifiers in addition to the protective colloid component. Preferably, no emulsifiers are employed. The pH range desired for polymerization, which is generally between 2.0 and 10, preferably between 2 and 3, can be established in a known manner by means of acids, bases and customary buffer salts, such as alkali metal phosphates or alkali metal carbonates. To adjust the molecular weight it is possible in the course of polymerization to add the regulators which are commonly used, examples being mercaptans, aldehydes and chlorinated hydrocarbons.

The polymerization can be conducted either batchwise, semibatchwise or by the metering technique, or else continuously. The polymerization is conducted with particular preference as an initial charge technique, with the monomers all being included in the initial charge and only the initiator being metered in. The protective colloids can be included in their entirety in the initial charge, metered in their entirety, or included partially in the initial charge and the rest metered in. Preferably, all of the protective colloid is included in the initial charge. The initial charge technique in which the monomers and the protective colloid are included in their entirety in the initial charge ensures a higher molecular weight than in the case of metering variants.

The emulsion or suspension polymerization procedure of the invention makes it possible to obtain markedly higher solids contents than by the precipitation polymerization technique customary to date, thereby making the preparation of the thickeners much more economic. Dispersions having a solids content of from 10 to 40%, preferably of from 15 to 30% are obtained, as compared with from 6 to 8% in the case of precipitation polymerization.

The thickeners can be employed in the form of their aqueous dispersions. An alternative procedure is to dry the dispersions obtained by the process of the invention using known techniques, such as spray drying, for example, and to employ them as a powder. In this case the normal procedure is to add the thickener dispersion or the thickener powder to the aqueous system that is to be thickened and then to add a base in order to adjust the pH of the mixture to a degree such that the carboxylate and carboxamide groups are neutralized and the copolymers are converted into their water-soluble form in which they develop their thickening effect.

The thickeners are suitable for thickening aqueous, hydraulically setting and nonhydraulically setting binder compositions: for example, as thickeners in coating compositions such as emulsion paints and textile coatings; as thickeners in adhesive compositions; as thickeners in building material compositions such as concrete, cement mortar, lime mortar, gypsum mortar. The amounts employed are generally within a range from 0.01 to 5% by weight of thickener (solids) based on the overall weight of the composition that is to be thickened.

The use of the thickeners in hydraulically setting compositions is particularly advantageous since it has been found, surprisingly, that the good thickening action in hydraulically setting compositions is not lost in the case of the preparation, in accordance with the invention, by means of emulsion or suspension polymerization. The reason that this is surprising is that normally the polymerization of carboxylic acids and carboxamides in aqueous solution produces particularly high molecular weights which are responsible for the good action as a standardizing agent. It was unforeseeable that modifying the process to make it a two-phase process would achieve equally high molecular weights.

EXAMPLE 1

Preparing an acrylamide-acrylic acid copolymer with 33% by weight polyvinyl alcohol (Höppler viscosity 4 mPas, hydrolysis number 140):

A polymerization vessel with a volume of 3 liters, a stirrer and feedports for two metered additions was charged with the initial charge and the stirrer was started. The stirrer speed was 200 rpm.

| Initial charge: | |
|---|---|
| Water | 885 g |
| Acrylamide (30% strength solution) | 147.4 g |
| Acrylic acid | 44.2 g |
| Polyvinyl alcohol (20% strength solution) | 177 g |
| n-Butyl acrylate | 17.7 g |

To start the polymerization, 25 g of a 3% strength solution of potassium persulfate and 25 g of a 1.5% strength solution of Brüggolit (sodium formaldehyde-sulfoxylate) were metered in each at 8 g/h. The internal temperature was regulated so as not to exceed a reaction temperature of 40° C. The metering time was 3 h. Thereafter the batch was cooled and postpolymerization was carried out by adding 3 g of a 10% strength solution of t-butyl hydroperoxide and 6 g of a 1.5% strength solution of Brüggolit. The result was a stable dispersion which was free from coagulum. The dispersion was neutralized by adding 700 g of a 3% strength aqueous NaOH solution, which was accompanied by a marked increase in viscosity. The characteristic data of the dispersion and the performance test data are compiled in Table 1.

EXAMPLE 2

Preparing an acrylamide-acrylic acid copolymer with 33% by weight polyvinyl alcohol (Höppler viscosity 4 mpas, hydrolysis number 140):

The procedure was as in Example 1 but modified by the use of the following amounts:

| Initial charge: | |
|---|---|
| Water | 605 g |
| Acrylamide (30% strength solution) | 480 g |
| Acrylic acid | 144 g |
| Polyvinyl alcohol (20% strength solution) | 576 g |
| n-Butyl acrylate | 57.6 g |

To start the polymerization, the initiators (3% strength solution of potassium persulfate and 1.5% strength solution of Brüggolit) were metered in each at 22 g/h. After 30 minutes, an additional 800 g of water were added over the course of 5 minutes. The internal temperature was regulated so as not to exceed a reaction temperature of 40° C. The metering time of the initiators was 3 h. Thereafter the batch was cooled and postpolymerization was carried out by adding 8 g of a 10% strength solution of t-butyl hydroperoxide and 16 g of a 1.5% strength solution of Brüggolit. The result was a stable dispersion which was free from coagulum. The characteristic data of the dispersion and the performance test data are compiled in Table 1.

EXAMPLE 3

Preparing an acrylamide-acrylic acid copolymer with 66% by weight polyvinyl alcohol (Höppler viscosity 4 mPas, hydrolysis number 140):

The procedure was as in Example 1 but modified by the use of the following amounts:

| Initial charge: | |
|---|---|
| Water | 1012 g |
| Acrylamide (30% strength solution) | 400 g |
| Acrylic acid | 120 g |
| Polyvinyl alcohol (20% strength solution) | 964 g |
| n-Butyl acrylate | 50 g |

To start the polymerization, the initiators were metered in each at 20 g/h. The internal temperature was regulated so as not to exceed a reaction temperature of 40° C. The metering time of the initiators was 3 h. Thereafter the batch was cooled and postpolymerization was carried out by adding 5 g of a 10% strength solution of t-butyl hydroperoxide and 10 g of a 1.5% strength solution of Brüggolit. The result was a stable dispersion which was free from coagulum. The characteristic data of the dispersion and the performance test data are compiled in Table 1.

EXAMPLE 4

Preparing an acrylamide-acrylic acid copolymer with 33% by weight polyvinyl alcohol (Höppler viscosity 4 mPas, hydrolysis number 140):

The procedure was as in Example 1 but modified by the use of the following amounts:

| Initial charge: | |
|---|---|
| Water | 506 g |
| Acrylamide (30% strength solution) | 200 g |
| Acrylic acid | 60 g |

| -continued | |
|---|---|
| Initial charge: | |
| Polyvinyl alcohol (20% strength solution) | 482 g |
| n-Butyl acrylate | 25 g |

To start the polymerization, the initiators were metered in each at 20 g/h. After 60 minutes, an additional 200 g of acrylamide (30% strength), 60 g of acrylic acid and 25 g of n-butyl acrylate were added over the course of 5 minutes. The internal temperature was regulated so as not to exceed a reaction temperature of 40° C.. The metering time of the initiators was 3 h. Thereafter the batch was cooled and postpolymerization was carried out by adding 8 g of a 10% strength solution of t-butyl hydroperoxide and 16 g of a 1.5% strength solution of Brüggolit. The result was a stable dispersion which was free from coagulum. The characteristic data of the dispersion and the performance test data are compiled in Table 1.

EXAMPLE 5

Preparing an acrylamide-acrylic acid copolymer with 16.5% by weight polyvinyl alcohol (Höppler viscosity 4 mPas, hydrolysis number 140):

The procedure was as in Example 1 but modified by the use of the following amounts:

| Initial charge: | |
|---|---|
| Water | 658 g |
| Acrylamide (30% strength solution) | 439 g |
| Acrylic acid | 132 g |
| Polyvinyl alcohol (20% strength solution) | 263 g |
| n-Butyl acrylate | 53 g |

To start the polymerization, the initiators were metered in each at 20 g/h. The internal temperature was regulated so as not to exceed a reaction temperature of 40° C. The metering of the initiators time was 3 h. Thereafter the batch was cooled and postpolymerization was carried out by adding 8 g of a 10% strength solution of t-butyl hydroperoxide and 16 g of a 1.5% strength solution of Brüggolit. The result was a stable dispersion which was free from coagulum. The characteristic data of the dispersion and the performance test data are compiled in Table 1.

Comparative Example 6

Preparing an acrylamide-acrylic acid copolymer by means of precipitation polymerization:

The procedure was similar to that of Example 1 but without protective colloid and by means of precipitation polymerization using the following amounts:

| Initial charge: | |
|---|---|
| Water | 908 g |
| Acrylamide (30% strength solution) | 168 g |
| Acrylic acid | 50.5 g |

To start the. polymerization, the initiators were metered in each at 5 g/h. The internal temperature was regulated so as not to exceed a reaction temperature of 40° C. The metering time of the initiators was 3 h. Thereafter the batch was cooled and postpolymerization was carried out by adding 8 g of a 10% strength solution of t-butyl hydroperoxide and 16 g of a 1.5% strength solution of Brüggolit. Neutralization was then carried out by adding 22 g of NaOH and 800 g of water. This gave a highly viscous solution of the copolymer in water. The characteristic data of the dispersion and the performance test data are compiled in Table 1.

Comparative Example 7

Preparing an acrylamide-acrylic acid copolymer without butyl acrylate and with 38.8% by weight polyvinyl alcohol (Höppler viscosity 4 mPas, hydrolysis number 140):

The procedure was as in Example 1 but modified by the use of the following amounts:

| Initial charge: | |
|---|---|
| Water | 1000 g |
| Acrylamide (30% strength solution) | 177 g |
| Acrylic acid | 50 g |
| Polyvinyl alcohol (20% strength solution) | 200 g |
| n-Butyl acrylate | 0 g |

To start the polymerization, the initiators were metered in each at 10 g/h. The internal temperature was regulated so as not to exceed a reaction temperature of 40° C. The metering time of the initiators was 3 h. Thereafter the batch was cooled and postpolymerization was carried out by adding 8 g of a 10% strength solution of t-butyl hydroperoxide and 16 g of a 1.5% strength solution of Brüggolit. The result was an aqueous solution. The characteristic data of the solution and the performance test data are compiled in Table 1.

Comparative Example 8

Preparing a methacrylic acid-methyl methacrylate copolymer in accordance with EP-A 627 450:

Example 4 of EP-A 627 450 was reworked. The product was obtained as a stable dispersion but with a large amount of sieve residue. Further data are given in Table 1.

Performance Testing

To examine the thickening effect of the examples of the invention and the comparative examples, the following test was conducted: A mortar mixture of the following formulation was prepared (in g):

| | |
|---|---|
| Portland cement PZ35F | 400 |
| Quartz flour W8 | 100 |
| Quartz sand F34 | 505 |
| Hydrated lime | 8 |
| Tylose MH2000XP | 1.5 |
| Water | 290 |
| Thickener of examples (solids content) | 0.15 |

The mortar was then placed in a Daniel trough and stored for 1, 3, 5 and 10 minutes in each case. After each storage period the trough was placed upright and the flow of the composition was read off on the scale at 2 minute intervals. A high value means that the composition is still highly flowable, with a low value meaning, correspondingly, that the composition is highly viscous or stable.

From the results in Table 1 it can be seen that the examples in accordance with the invention not only give stable dispersions but also possess good performance properties (thickening effect). From the comparative examples it is evident that the dispersions lack either stability (Comparative Example 6/7) or thickening effect (Comparative Example 8).

TABLE 1

Product data from inventive and comparative examples
(stability refers to the dispersion stability, with formation of a sieve residue and propensity to sedimentation having been taken into account)

| Example | Trough flow [cm] | | | | Solids content [%] | pH | Viscosity [mpas] | Particle size [nm] | Stability |
|---|---|---|---|---|---|---|---|---|---|
| | 1 min | 3 min | 5 min | 10 min | | | | | |
| 1 | 10 | 4 | 1.5 | 1 | 10.8 | 2.7 | 450 | 354 | very good |
| 2 | 9.5 | 3.5 | 1.5 | 0.5 | 16.2 | 2.6 | 1450 | 101 | very good |
| 3 | 11.5 | 3 | 1.5 | 0.5 | 18.4 | 2.5 | 850 | 424 | very good |
| 4 | 10 | 4.5 | 1 | 0.5 | 23.1 | 2.6 | 59 | 410 | very good |
| 5 | 9 | 3 | 1.5 | 0.5 | 15.8 | 2.3 | 140 | 158 | very good |
| 6 | 9.5 | 4 | 2 | 1 | 6.4 | 6.2 | 9650 | — | poor |
| 7 | 11 | 6 | 2 | 0.5 | 9.4 | 2.6 | 1330 | — | poor |
| 8 | 14.5 | 13 | 12.5 | 12 | 27.8 | 4 | 91 | 6200 | moderate |

What is claimed is:

1. A thickener in the form of an aqueous dispersion or power and which is based on carboxyl- and carboxamido-containing addition polymers obtainable by free-radical emulsion or suspension polymerization in an aqueous phase of:

a) from 30 to 70% by weight of a carboxylic acid group-containing ethylenically unsaturated monomers;

b) from 10 to 70% by weight of a carboxylic acid amide group-containing ethylencially unsaturated monomers and c) from 0.1 to 30% by weight of further ethylenically unsaturated hydrophobic monomers selected from the group consisting of vinyl esters, (meth)acrylates and vinylaromatic compounds in the presence of at least 5% by weight of at least one water-soluble protective colloid selected from the group consisting of non-grafted polyvinyl alcohols, non-grafted polyvinyl pyrrolidones and non-grafted (meth)acrylate-(meth)acrylic acid copolymers, the percentages by weight being based in each case on the overall weight of the comonomers.

2. The thickener as claimed in claim 1, wherein
   a) from 30 to 60% by weight of one or more monomers selected from the group consisting of acrylic, methacrylic, maleic, itaconic, fumaric and crotonic acid, and
   b) from 30 to 60% by weight of one or more monomers selected from the group consisting of monoamides and diamides of acrylic, methacrylic, maleic, itaconic, fumaric and crotonic acid, and
   c) from 5 to 20% by weight of one or more monomers selected from the group of the vinyl esters, (meth) acrylates and vinylaromatic compounds are copolymerized.

3. The thickener as claimed in claim 1, wherein
   a) from 30 to 60% by weight of one or more monomers selected from the group consisting of acrylic and methacrylic acid, and
   b) from 30 to 60% by weight of one or more monomers selected from the group consisting of acrylamide and methacrylamide, and
   c) from 5 to 20% by weight of one or more monomers selected from the group consisting of n-butyl acrylate, n-butyl methacrylate, 2-ethylhexyl methacrylate and 2-ethylhexyl acrylate are copolymerized.

4. The thickener as claimed in claim 1, wherein polymerization is carried out in the presence of from 10 to 80% by weight of one or more partially hydrolyzed polyvinyl alcohols having a Höppler viscosity of from 3 to 28 mPas and a hydrolysis number of from 70 to 200.

5. Hydraulically setting and nonhydraulically setting binder compositions containing the thickener as claimed in claim 1.

6. Adhesive compositions and building material compositions containing the thickener as claimed in claim 1.

7. A building material selected from the group consisting of concrete, cement mortar, lime mortar and gypsum mortar which contains as a thickener the thickener of claim 1.

8. A process for preparing a thickener based on carboxyl- and carboxamido-containing addition polymers which comprises polymerizing the free-radical emulsion or suspension polymerization:
   a) from 30 to 70% by weight of carboxylic acid group-containing ethylenically unsaturated monomers;
   b) from 10 to 70% by weight of a carboxylic acid amide group-containing ethylenically unsaturated monomers and
   c) from 0.1 to 30% by weight of further ethylenically unsaturated hydrophobic monomers selected from the group consisting of vinyl esters, (meth) acrylates and vinylaromatic compounds in the presence of at least 5% by weight of at least one water-soluble protective colloid selected from the group consisting of non-grafted polyvinyl alcohols, non-grafted polyvinyl pyrrolidones and non-grafted (meth)acrylate-(meth)acrylic acid copolymers, the percentages by weight being based in each case on the overall weight of the comonomers.

9. The process as claimed in claim 8, wherein preparation takes place by emulsion polymerization in an aqueous phase at temperatures from 30 to 60° C. and without the addition of emulsifier.

10. The process as claimed in claim 8, wherein the polymerization is conducted as an initial charge process in which all of the monomers and the protective colloid are included in the initial charge and only the initiator is metered in.

* * * * *

UNITED STATES PATENT AND TRADEMARK OFFICE
CERTIFICATE OF CORRECTION

PATENT NO. : 6,197,871 B1
DATED : March 6, 2001
INVENTOR(S) : Hans-Peter Weitzel and Robert Braunsperger It is certified that error appears in the above-identified patent and that said Letters Patent is hereby corrected as shown below:

<u>Title page,</u>
Item [22], filing date of "January 15, 2000" should read -- February 7, 2000 --.

Signed and Sealed this

Twenty-second Day of April, 2003

JAMES E. ROGAN
*Director of the United States Patent and Trademark Office*